United States Patent
Yanagida

(10) Patent No.: US 12,025,220 B2
(45) Date of Patent: Jul. 2, 2024

(54) SHIFT DEVICE

(71) Applicant: SUZUKI MOTOR CORPORATION, Hamamatsu (JP)

(72) Inventor: Shoji Yanagida, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 18/365,603

(22) Filed: Aug. 4, 2023

(65) Prior Publication Data
US 2024/0068566 A1    Feb. 29, 2024

(30) Foreign Application Priority Data

Aug. 30, 2022 (JP) ................. 2022-136939

(51) Int. Cl.
| | | |
|---|---|---|
| F16H 63/18 | (2006.01) | |
| F16H 61/04 | (2006.01) | |
| F16H 63/30 | (2006.01) | |
| F16H 59/02 | (2006.01) | |
| F16H 59/14 | (2006.01) | |

(52) U.S. Cl.
CPC ............ F16H 63/18 (2013.01); F16H 61/04 (2013.01); F16H 63/3013 (2013.01); F16H 2059/0234 (2013.01); F16H 2059/147 (2013.01); F16H 2063/3079 (2013.01)

(58) Field of Classification Search
CPC ...... F16H 63/18; F16H 61/04; F16H 63/3013; F16H 2059/147; F16H 2059/0234; F16H 63/14

See application file for complete search history.

(56) References Cited

U.S. PATENT DOCUMENTS

| 5,395,293 | A  * | 3/1995 | Matsuura ........... B60W 30/1819 477/20 |
| --- | --- | --- | --- |
| 7,891,262 | B2 * | 2/2011 | Hayakawa .............. F16H 59/68 74/337.5 |
| 8,150,587 | B2 * | 4/2012 | Tomoda ................ F16D 25/086 701/67 |
| 8,387,477 | B2 * | 3/2013 | Ieda ........................ F16H 63/14 74/473.26 |

(Continued)

FOREIGN PATENT DOCUMENTS

| JP | H0539865 A * | 2/1993 |
| --- | --- | --- |
| WO | WO 2018-110537 A1 | 6/2018 |

OTHER PUBLICATIONS

Extended European Search Report dated Jan. 18, 2024, issued by the European Patent Office in corresponding application EP 23193053.8.

*Primary Examiner* — Sherry L Estremsky
(74) *Attorney, Agent, or Firm* — Stein IP, LLC

(57) ABSTRACT

A shift device that causes a transmission device to shift in response to a shift operation of a shift pedal includes a shift shaft configured to rotate in response to the shift operation of the shift pedal, a shift cam configured to rotate in a manner of being capable of changing a coupling state of a shift gear of the transmission device, a drive plate configured to move the shift cam in response to the rotation of the shift shaft, and a lost motion mechanism interposed between the shift shaft and the drive plate. The lost motion mechanism is attached to one end portion of the shift shaft and absorbs the rotation of the shift shaft to delay power transmission to the drive plate.

5 Claims, 8 Drawing Sheets

(56) References Cited

U.S. PATENT DOCUMENTS

| | | | |
|---|---|---|---|
| 8,555,739 B2* | 10/2013 | Ieda | F16H 63/18 74/473.26 |
| 10,544,863 B2* | 1/2020 | Takahashi | F16H 63/18 |
| 2009/0084208 A1 | 4/2009 | Hayakawa et al. | 74/325 |
| 2020/0378496 A1 | 12/2020 | Arai et al. | |

* cited by examiner

SHIFT DEVICE

CROSS-REFERENCE TO RELATED APPLICATIONS

This application is based on Japanese Patent Application No. 2022-136939 filed on Aug. 30, 2022, the contents of which are incorporated herein by way of reference.

TECHNICAL FIELD

The present disclosure relates to a shift device.

BACKGROUND

As a shift device for a straddle type vehicle, a shift device in which a lost motion mechanism is provided on a shift pedal is known (for example, see Patent Literature 1). In a shift device disclosed in Patent Literature 1, one end of a shift shaft protrudes from an upper side surface of a crankcase, a shift pedal extends rearward from a lower side surface of the crankcase, and one end of the shift shaft and an intermediate portion of the shift pedal are coupled via a shift rod. While a load of a dog of a transmission device acts on the shift pedal during a shift operation, an operation feeling of the shift operation is improved by absorbing the load with the lost motion mechanism of the shift pedal.

Patent Literature 1: WO2018/110537

However, since the lost motion mechanism disclosed in Patent Literature 1 is provided on the shift pedal outside the engine, there is a problem that the shift pedal is increased in size and a degree of freedom of a layout of the shift device is reduced.

SUMMARY

The present disclosure has been made in view of the above, and an object thereof is to provide a shift device capable of improving convenience of a user with a compact structure.

In order to solve the above problems, a shift device according to an aspect of the present disclosure is a shift device that causes a transmission device to shift in response to a shift operation of a shift pedal. The shift device includes: a shift shaft configured to rotate in response to the shift operation of the shift pedal; a shift cam configured to rotate in a manner of being capable of changing a coupling state of a shift gear of the transmission device; a drive plate configured to move the shift cam in response to the rotation of the shift shaft; and a lost motion mechanism interposed between the shift shaft and the drive plate, in which the lost motion mechanism is attached to one end portion of the shift shaft and absorbs the rotation of the shift shaft to delay power transmission to the drive plate.

DESCRIPTION OF EMBODIMENTS

A shift device according to an aspect of the present disclosure causes a transmission device to shift in response to a shift operation of a shift pedal. A shift shaft rotates in response to the shift operation of the shift pedal, the shift cam is moved by a drive plate in response to the rotation of the shift shaft, and a coupling state of a shift gear of the transmission device is changed by the shift cam. The lost motion mechanism is interposed between the shift shaft and the drive plate, the rotation of the shift shaft is absorbed by the lost motion mechanism, and power transmission to the drive plate is delayed. Accordingly, the shift shaft rotates in response to the shift operation, but immediately after the shift operation, the drive plate does not move due to reaction force of the shift cam, and the rotation of the shift shaft is absorbed by the lost motion mechanism. A further shift operation causes the rotation of the shift shaft to be transmitted to the drive plate with a delay, and the drive plate moves the shift cam. Accordingly, immediately after a shift operation with a large operating load, depression of the shift pedal is not transmitted to the shift cam, thereby improving a feeling of the shift operation. Further, by attaching the lost motion mechanism to one end of the shift shaft, a structure becomes compact and a degree of freedom of a layout of the shift device is improved.

EMBODIMENTS

Figure 1:
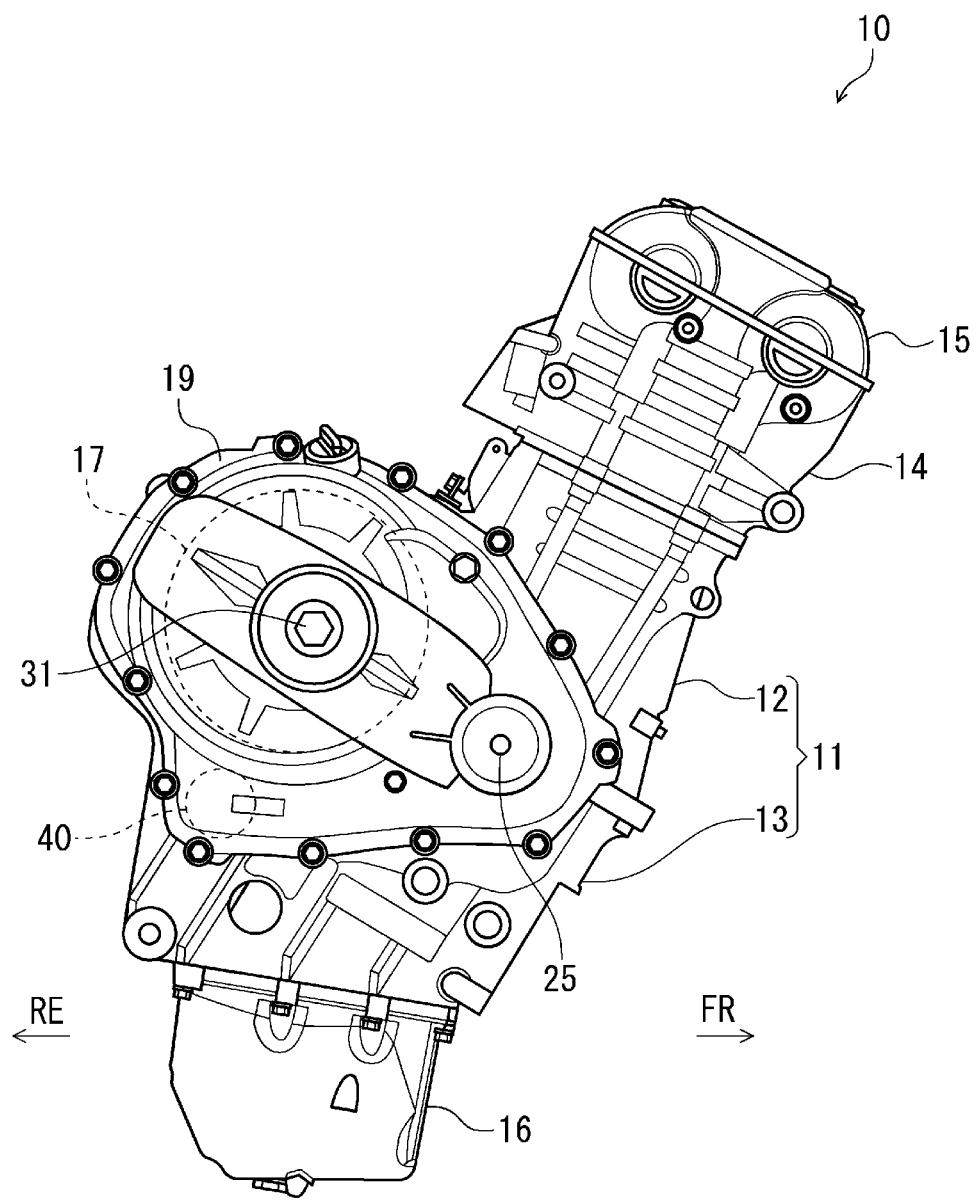
FIG. 1 is a right side view of an engine according to the present embodiment.
Figure 2:
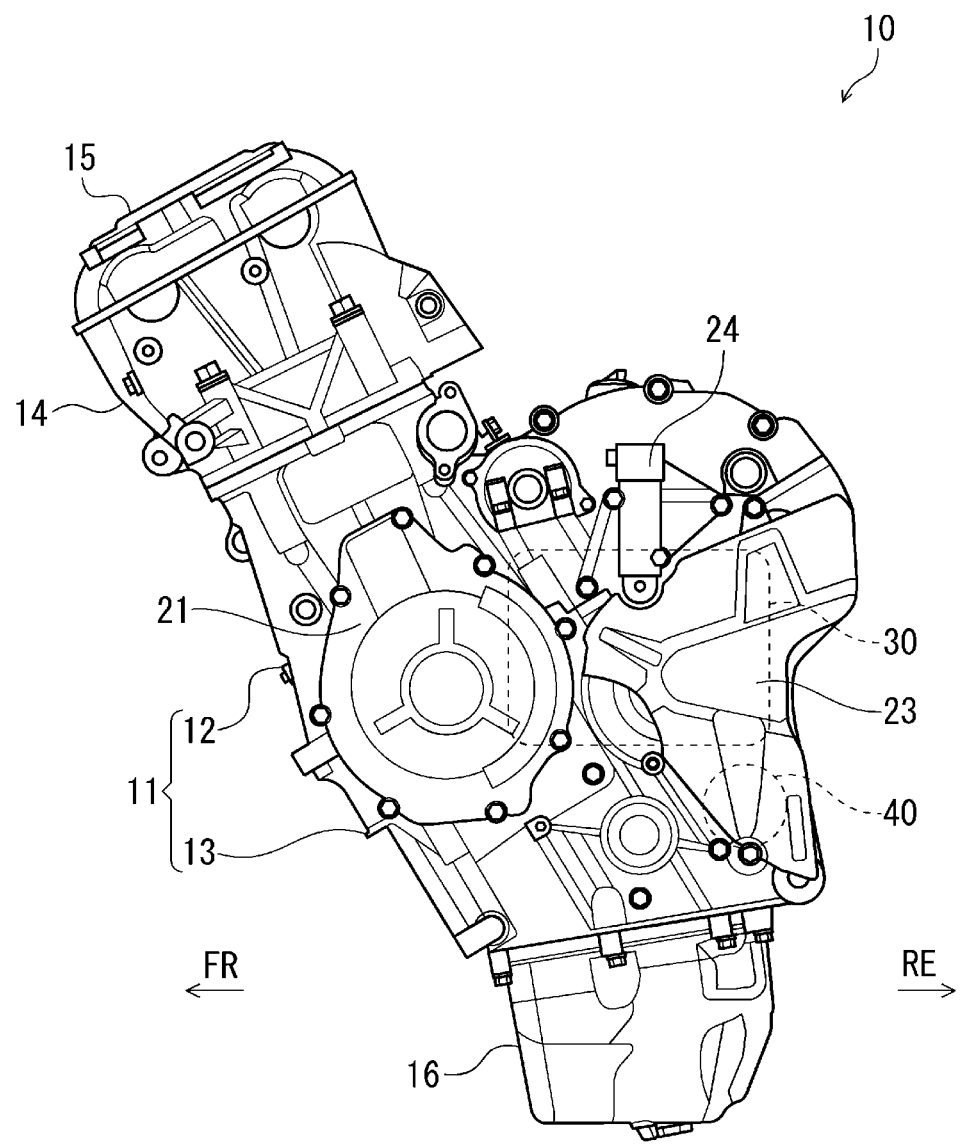
FIG. 2 is a left side view of the engine according to the present embodiment.

Hereinafter, an engine according to the present embodiment will be described with reference to the accompanying drawings. FIG. 1 is a right side view of the engine according to the present embodiment. FIG. 2 is a left side view of the engine according to the present embodiment. Further, in the following drawings, an arrow FR indicates a vehicle front side, an arrow RE indicates a vehicle rear side, an arrow L indicates a vehicle left side, and an arrow R indicates a vehicle right side.

As shown in FIG. 1, the engine 10 includes a crankcase 11 including a vertically split structure including an upper case 12 and a lower case 13. The upper case 12 is integrated with a cylinder, and a cylinder head 14 and a cylinder head cover 15 are attached to an upper portion of the upper case 12. A valve gear (not shown) that operating an intake and exhaust valve is accommodated inside the cylinder head 14 and the cylinder head cover 15. An oil pan 16 that stores oil for lubrication and cooling is attached to a lower portion of the lower case 13. A clutch cover 19 that covers a clutch 17 from a side is attached to a right side surface of the crankcase 11.

As shown in FIG. 2, a magnet cover 21 that covers a magnet (not shown) from the side is attached to a left side surface of the crankcase 11. A sprocket cover 23 that covers a part of a drive chain (not shown) that drives a rear wheel and a drive sprocket 22 (see FIG. 3) from the side is attached to a rear side of the magnet cover 21. An oil control valve 24 that controls an oil pressure of the engine 10 is attached above the sprocket cover 23. A transmission device 30 that transmits power from a crankshaft 25 (see FIG. 1) and a shift device 40 that causes the transmission device 30 to shift are accommodated inside the engine 10.

Such an engine 10 employs a quick shift that detects the shift operation of a driver and is capable of shifting without clutch operation. In the general quick shift, an operation stroke of the shift pedal is detected by a stroke sensor provided outside the engine 10. In this case, a layout of the stroke sensor is restricted by other parts outside the engine 10, and the stroke sensor is exposed to the outside, and thus a weatherability requirement such as rust prevention is increasing. Therefore, a method for detecting the shift operation in the engine 10 using a gear position sensor has also been studied.

In the quick shift using the gear position sensor, in a state in which a load is applied to a dog of the shift gear, rotation of the shift cam is detected by the gear position sensor, and an engine output is controlled to reduce the load applied to the dog. However, there is a time lag between detecting the rotation of the shift cam and controlling the engine output, and the load continues to be applied to the dog for a certain period of time immediately after the shift operation, and thus the operation feeling becomes stiff. Therefore, in the present embodiment, a lost motion mechanism 61 is provided in the shift device 40 to delay the power transmission from the shift pedal to the shift cam immediately after the shift operation.

Figure 3:
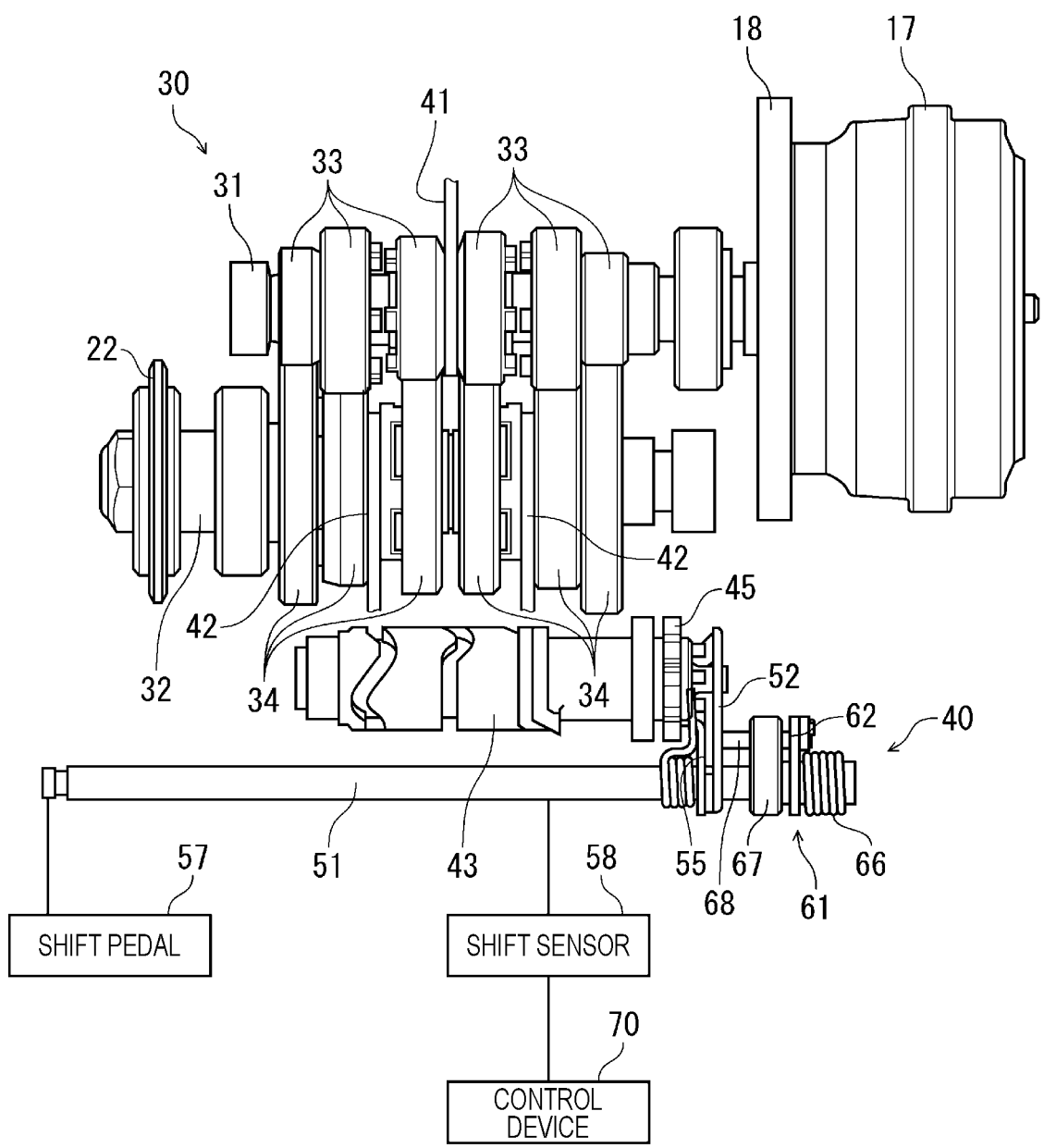
FIG. 3 is a schematic view of a transmission device and a shift device according to the present embodiment.
Figure 4:
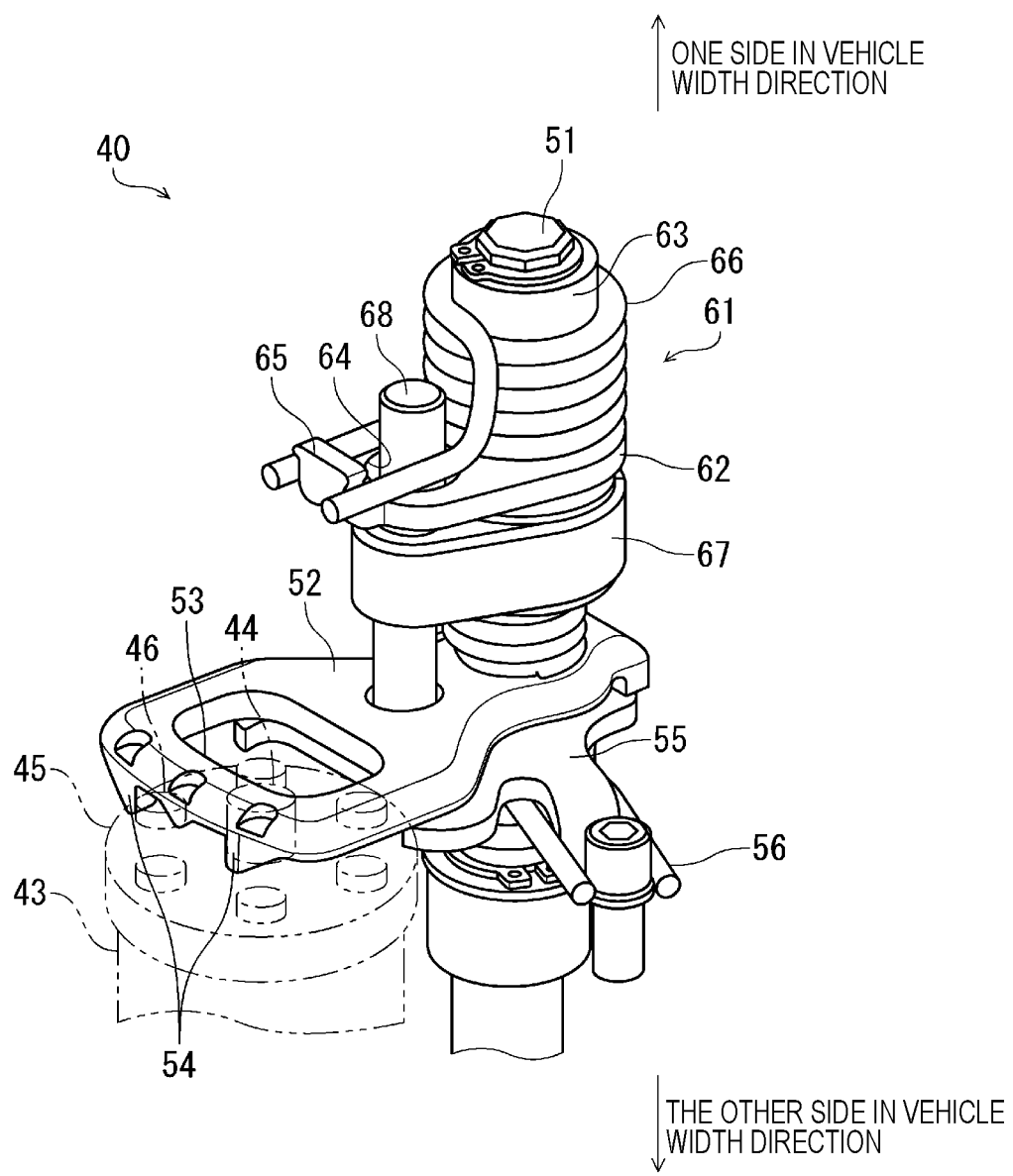
FIG. 4 is a perspective view of the shift device according to the present embodiment.
Figure 5:
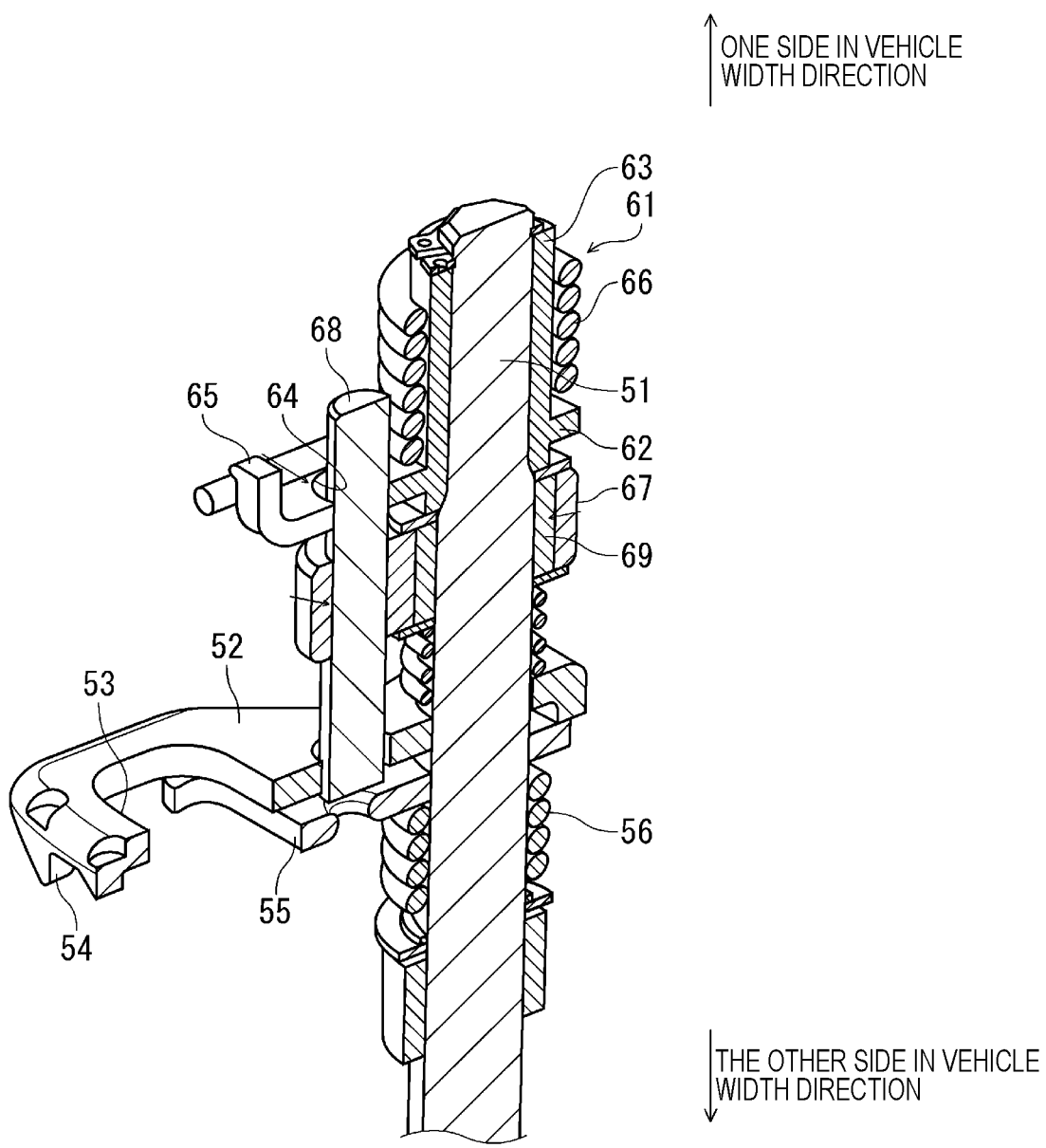
FIG. 5 is a sectional perspective view of the shift device according to the present embodiment.

The transmission device and the shift device will be described with reference to FIGS. 3 to 5. FIG. 3 is a schematic view of the transmission device and the shift device according to the present embodiment. FIG. 4 is a perspective view of the shift device according to the present embodiment. FIG. 5 is a sectional perspective view of the shift device according to the present embodiment.

As shown in FIG. 3, the transmission device 30 is provided with a counter shaft 31 and a drive shaft 32 parallel to the crankshaft 25 (see FIG. 1). The clutch 17 is provided at one end portion of the counter shaft 31, and the power from the crankshaft 25 to the counter shaft 31 is transmitted and blocked by the clutch 17. The counter shaft 31 and the drive shaft 32 are coupled to each other via a plurality of shift gears 33 and 34. The drive sprocket 22 is provided at one end portion of the drive shaft 32, and the power is transmitted to the rear wheel (not shown) by the drive sprocket 22.

The shift gears 33 and 34 respectively provided on the counter shaft 31 and the drive shaft 32 includes a fixed gear that rotates integrally with the shaft and an idler gear that idles with respect to the shaft. A claw called the dog is formed on each of a side surface of the fixed gear and the idler gear, and the fixed gear is moved in an axial direction by shift forks 41, 42, and the fixed gear and the idler gear which are adjacent to each other in the axial direction are coupled or separated. A shift cam 43 and a shift shaft 51 are provided below the transmission device 30 in a manner of being parallel to the shafts 31 and 32. A cam groove that causes the shift forks 41, 42 to slide in the axial direction is formed on an outer peripheral surface of the shift cam 43.

One end portion of the shift cam 43 is provided with a cam plate 45, and the shift shaft 51 is provided with a drive plate 52 coupled to the cam plate 45. The lost motion mechanism 61 is provided at one end portion of the shift shaft 51, and the shift shaft 51 and the drive plate 52 are coupled via the lost motion mechanism 61. A shift pedal 57 is coupled to the other end portion of the shift shaft 51 via a link mechanism (not shown) or the like. As described above, the engine 10 is provided with the shift device 40 in which the lost motion mechanism 61 is interposed in a power transmission path from the shift pedal 57 to the shift cam 43.

When the shift pedal 57 is operated by the driver, the shift shaft 51 is rotated by a predetermined angle, and rotation of the shift shaft 51 is transmitted to the shift cam 43 via the lost motion mechanism 61 and the like. When the shift cam 43 is rotated by a predetermined angle, the shift forks 41 and 42 slide in the axial direction, and a coupling state between the shift gears 33 and 34 respectively provided on the counter shaft 31 and the drive shaft 32 is changed. The shift stage is switched depending on the coupling state between the shift gears 33 and 34 respectively provided on the counter shaft 31 and the drive shaft 32, and driving force of the crankshaft 25 is transmitted to the rear wheel in a state in which a rotation speed and torque are changed.

A shift sensor 58 is provided in the shift device 40, and the shift operation is detected by the shift sensor 58. For example, the shift operation is detected from the operation of the shift pedal 57, the rotation of the shift shaft 51, and actuation of the lost motion mechanism 61, by the shift sensor 58. A detection signal of the shift sensor 58 is input to a control device 70 of the engine 10 (see FIG. 1), and engine torque input to the transmission device 30 is controlled by the control device 70. Since the engine torque is temporarily reduced by the control device 70 after the shift operation, the load applied to the dog of the shift gears 33 and 34 is reduced.

As described above, there is a time lag between the detection of the shift operation and the reduction of the engine torque, and the load applied to the dogs of the shift gears 33 and 34 is not sufficiently decreased immediately after the shift operation. Therefore, the rotation of the shift shaft 51 is absorbed by the lost motion mechanism 61 until the engine torque is temporarily reduced by the control device 70 after the shift operation, and the power transmission from the shift shaft 51 to the drive plate 52 is delayed. Further, since the power is transmitted from the shift pedal 57 to the shift cam 43 after an operating load of the shift operation becomes small, the operation feeling of the shift operation is improved.

As shown in FIGS. 4 and 5, the drive plate 52, a shift arm 55, and the lost motion mechanism 61 are attached to one end side of the shift shaft 51 of the shift device 40. Operation force is input to the shift shaft 51 from the shift pedal 57 (see FIG. 3), and the shift shaft 51 rotates in response to the shift operation of the shift pedal 57. The drive plate 52 is supported by the shift shaft 51 in a manner of being rotatable relative to the shift shaft 51. The rotation of the shift shaft 51 is input to the drive plate 52 via the lost motion mechanism 61, and the shift cam 43 (see FIG. 3) is moved by the drive plate 52 in response to the rotation of the shift shaft 51.

The drive plate 52 extends from the shift shaft 51 toward the shift cam 43. An opening 53 is formed in the drive plate 52, and a camshaft 44 of the shift cam 43 enters the opening 53. The shift cam 43 is provided with the cam plate 45 in a manner of facing the drive plate 52. A claw 54 is formed on a distal side of the drive plate 52, and a plurality of shift pins 46 are formed on the cam plate 45. The claw 54 of the drive plate 52 hits the shift pin 46 of the cam plate 45, and the drive plate 52 swings about the shift shaft 51 to rotate the shift cam 43.

The coupling state of the shift gears 33 and 34 (see FIG. 3) of the transmission device 30 is changed by the rotation of the shift cam 43. Further, the shift shaft 51 is provided with the shift arm 55 on the other side in a vehicle width direction with respect to the drive plate 52. When the shift shaft 51 is rotated, the shift arm 55 abuts against the shift pin 46 of the cam plate 45 to regulate a rotation angle of the shift cam 43. A shaft return spring 56 is attached to the shift arm 55, and after the shift operation, the shift shaft 51 is returned to an initial position by restoring force of the shaft return spring 56. Thus, in the shift device 40, the transmission device 30 shifts in response to the shift operation of the shift pedal 57.

The lost motion mechanism 61 is interposed between the shift shaft 51 and the drive plate 52, that is, in the middle of a transmission path from the shift shaft 51 to the drive plate 52. The lost motion mechanism 61 transmits the power from the shift shaft 51 to the drive plate 52 via a lost motion plate 62, a torsion coil spring 66, and a pin 68 held by a pin holder 67. Since the rotation of the shift shaft 51 is absorbed by the torsion coil spring 66 of the lost motion mechanism 61, the power transmission from the shift shaft 51 to the drive plate 52 is delayed until a certain time elapses from immediately after the shift operation.

The lost motion plate 62 extends from the shift shaft 51 in a manner of facing the drive plate 52. A tubular portion 63 is formed on a proximal end side of the lost motion plate 62, the tubular portion 63 is fixed to the one end portion of the shift shaft 51, and the lost motion plate 62 is integrally rotated with the shift shaft 51. A long hole 64 extending along a rotation direction of the shift shaft 51 is formed in the lost motion plate 62. The torsion coil spring 66 is attached to an outer peripheral surface of the tubular portion 63, and both ends of the torsion coil spring 66 are hooked on a hook piece 65 at a distal of the lost motion plate 62.

The pin holder 67 is attached to the shift shaft 51 between the lost motion plate 62 and the drive plate 52. The pin holder 67 is supported by the shift shaft 51 via a needle bearing 69 such that the pin holder 67 rotates relative to the shift shaft 51. The pin holder 67 extends along the lost motion plate 62, and the pin 68 is press-fitted to a distal of the pin holder 67. The pin 68 extends parallel to the shift shaft 51, one end of the pin 68 is inserted into the long hole 64 of the lost motion plate 62, and the other end of the pin 68 is coupled to the drive plate 52.

One end side of the pin 68 is sandwiched between both ends of the torsion coil spring 66, and the torsion coil spring 66 holds the pin 68 at a neutral position away from an end surface of the long hole 64. When the pin 68 at the neutral position moves relative to the long hole 64 against elastic force of the torsion coil spring 66, the rotation of the shift shaft 51 is absorbed by the lost motion mechanism 61. Further, when the pin 68 moves against the elastic force of the torsion coil spring 66 and comes into contact with the end surface of the long hole 64, the lost motion plate 62 and the drive plate 52 integrally rotate via the pin 68, and the rotation of the shift shaft 51 is transmitted to the drive plate 52.

Figure 6A:
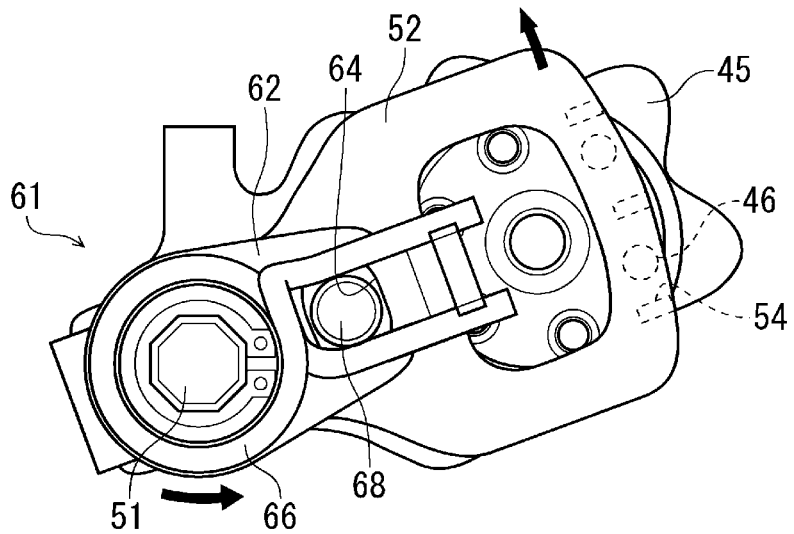
FIGS. 6A to 6C are diagrams illustrating an operation of the shift device according to the present embodiment.
Figure 6B:
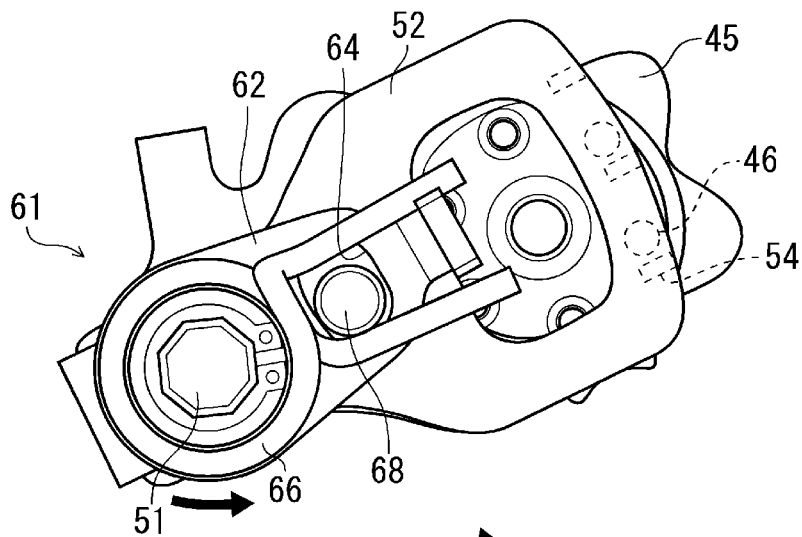
Figure 6C:
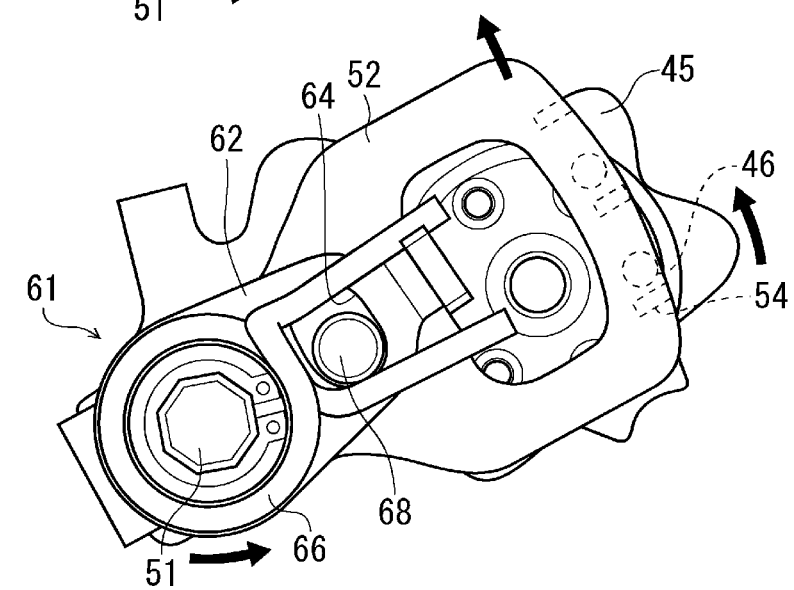

The operation of the shift device will be described with reference to FIGS. 6A to 6C. FIGS. 6A to 6C are diagrams illustrating the operation of the shift device according to the present embodiment.

As shown in FIG. 6A, when the operation of the shift pedal 57 (see FIG. 3) is started, the shift shaft 51 rotates and the lost motion plate 62 starts to swing. At this time point, the shift pin 46 on the cam plate 45 and the claw 54 of the drive plate 52 are separated from each other, and the drive plate 52 is isolated from the load applied to the dog of the shift gears 33 and 34 (see FIG. 3). Therefore, since resistance force of the pin 68 is small, in a state in which the pin 68 is held at the neutral position of the long hole 64 by the torsion coil spring 66, the lost motion plate 62 and the drive plate 52 integrally swing around the shift shaft 51 via the pin 68.

As shown in FIG. 6B, when the shift pedal 57 is further operated, the rotation of the shift shaft 51 starts to be absorbed by the lost motion mechanism 61. At this time point, the shift pin 46 on the cam plate 45 and the claw 54 of the drive plate 52 are in contact with each other, and the load applied to the dog of the shift gears 33 and 34 also acts on the drive plate 52. Therefore, the resistance force of the pin 68 increases, and the pin 68 is relatively moved with respect to the long hole 64 against the elastic force of the torsion coil spring 66. Although the lost motion plate 62 swings, the drive plate 52 does not move the shift cam 43.

As shown in FIG. 6C, when an operation amount of the shift pedal 57 further increases, the rotation of the shift shaft 51 starts to be transmitted to the drive plate 52. At this time point, the engine torque is reduced by the control device 70 (see FIG. 3), and the load acting on the drive plate 52 is reduced. When the pin 68 comes into contact with the end surface of the long hole 64, the lost motion plate 62 and the drive plate 52 integrally swing about the shift shaft 51 via the pin 68. Although the shift cam 43 is moved by the drive plate 52, the operating load of the shift operation is sufficiently small due to the reduction of the engine torque.

As described above, in the shift device 40 according to the present embodiment, the engine torque is controlled by the control device 70 before the pin 68 comes into contact with the end surface of the long hole 64. Therefore, the shift of the transmission device 30 (see FIG. 3) is completed without increasing the operating load of the shift operation, and the operation feeling is improved. Further, after the operation of the shift pedal 57, the shift shaft 51 is returned to the initial position by the restoring force of the shaft return spring 56 (see FIG. 4), and the pin 68 is returned to the neutral position of the long hole 64 by the restoring force of the torsion coil spring 66. A positional relationship between the drive plate 52 and the lost motion plate 62 is returned to an initial state.

Figure 7:
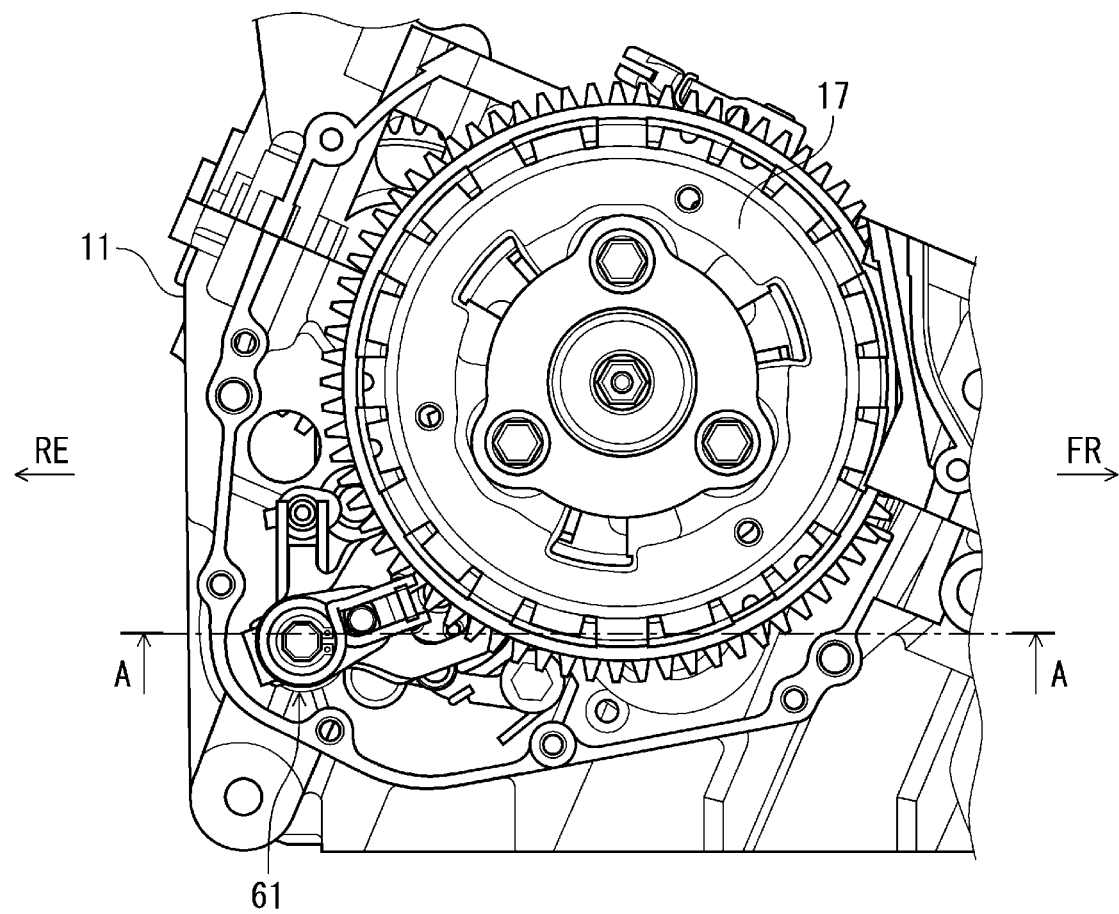
FIG. 7 is a right side view of a crankcase according to the present embodiment.
Figure 8:
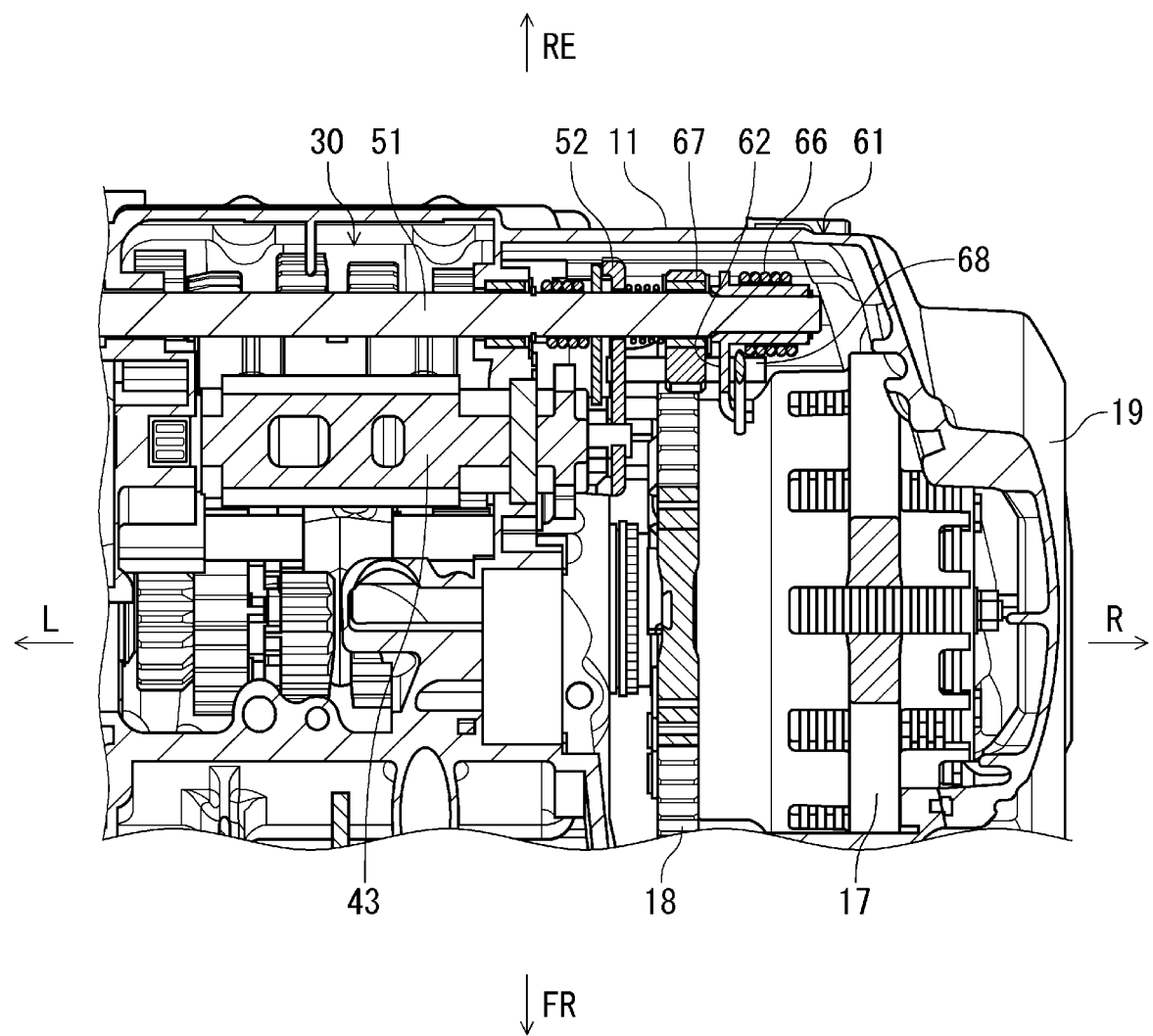
FIG. 8 is a cross-sectional view of the crankcase taken along a line A-A in FIG. 7.

A layout of the lost motion mechanism will be described with reference to FIGS. 7 and 8. FIG. 7 is a right side view of the crankcase according to the present embodiment. FIG. 8 is a cross-sectional view of the crankcase taken along a line A-A in FIG. 7.

As shown in FIG. 7, an accommodation chamber of the clutch 17 is formed on one side (right side) of the crankcase (case) 11 in the vehicle width direction. The accommodation chamber of the clutch 17 is extended rearward, and the lost motion mechanism 61 is accommodated in an extended portion of the accommodation chamber. By accommodating the lost motion mechanism 61 in the crankcase 11, it is possible to lower a weatherability requirement such as rust prevention without affecting a layout of an outside of a vehicle body. Further, since the lost motion mechanism 61 is accommodated in the accommodation chamber of the clutch 17, it becomes unnecessary to lubricate the lost motion mechanism 61 by splashing or immersion of engine oil during operation.

As shown in FIG. 8, the clutch 17 is provided at one side of the transmission device 30 in the vehicle width direction, and the lost motion mechanism 61 is positioned behind the clutch 17. The clutch 17 is provided with a driven gear 18 to which the power is input from the crankshaft 25 (see FIG. 1). The pin holder 67, the lost motion plate 62, and the torsion coil spring 66 excluding the pin 68 of the lost motion mechanism 61 are provided in a manner of being accommodated in an entire length of the clutch 17 including the driven gear 18. The lost motion mechanism 61 is provided by effectively utilizing a space behind the clutch 17, and an increase in dimension of the crankcase 11 in the vehicle width direction is prevented.

As described above, according to the shift device 40 of the present embodiment, the shift shaft 51 rotates in response to the shift operation, but immediately after the shift operation, the drive plate 52 does not move due to reaction force of the shift cam 43, and the rotation of the shift shaft 51 is absorbed by the lost motion mechanism 61. A further shift operation causes the rotation of the shift shaft 51 is transmitted to the drive plate 52 with a delay, and the shift cam 43 is moved by the drive plate 52. Accordingly, immediately after the shift operation with the large operating load, depression of the shift pedal 57 is not transmitted to the shift cam 43, thereby improving the feeling of the shift operation. Further, since the lost motion mechanism 61 is attached to the one end portion of the shift shaft 51, the layout flexibility of the shift device 40 is improved with the compact structure.

Although the lost motion mechanism using the torsion coil spring has been described in the above embodiment, the lost motion mechanism may be configured to absorb the rotation of the shift shaft and delay the power transmission to the drive plate. For example, the lost motion mechanism may be a lost motion mechanism using a combination of a flat cam and a pressing spring provided in a circumferential direction as described in WO2018/110537.

Further, in the above-described embodiment, the shift shaft is coupled to the shift pedal via the link mechanism or the like, but the shift shaft may be directly coupled to the shift pedal.

In the above embodiment, the lost motion mechanism is provided behind the clutch, a positional relationship between the clutch and the lost motion mechanism is not particularly limited. It is sufficient if the lost motion mechanism is accommodated in the case of the transmission device.

The engine is not limited to the engine of the straddle type vehicle described above, and may be applied to an engine of another straddle type vehicle. The straddle type vehicle is not limited to general vehicles on which a rider rides in a posture of straddling a seat, and also includes small-sized scooter type vehicles on which a rider rides without straddling a seat.

As described above, a first aspect is a shift device (40) that causes a transmission device (30) to shift in response to a shift operation of a shift pedal (57). The shift device (40) includes: a shift shaft (51) configured to rotate in response to the shift operation of the shift pedal; a shift cam (43) configured to rotate in a manner of being capable of changing a coupling state of a shift gear of the transmission device; a drive plate (52) configured to move the shift cam in response to the rotation of the shift shaft; and a lost motion mechanism (61) interposed between the shift shaft and the drive plate, and the lost motion mechanism is attached to one end portion of the shift shaft and absorbs the rotation of the shift shaft to delay power transmission to the drive plate. According to this configuration, the shift shaft rotates in response to the shift operation, but immediately after the shift operation, the drive plate does not move due to the reaction force of the shift cam, and the rotation of the shift shaft is absorbed by the lost motion mechanism. A further shift operation causes the rotation of the shift shaft to be transmitted to the drive plate with a delay, and the drive plate moves the shift cam. Accordingly, immediately after a shift operation with a large operating load, depression of the shift pedal is not transmitted to the shift cam, thereby improving a feeling of the shift operation. Further, by attaching the lost motion mechanism to one end of the shift shaft, a structure becomes compact and a degree of freedom of a layout of the shift device is improved.

In a second aspect, based on the first aspect, the lost motion mechanism includes a lost motion plate (62) configured to rotate integrally with the shift shaft, a pin holder (67) configured to hold a pin (68) and rotate relative to the shift shaft, and a torsion coil spring (66) attached to the lost motion plate, a long hole (64) is formed in the lost motion plate along a rotation direction, one end of the pin is inserted into the long hole, the other end of the pin is coupled to the drive plate, and the one end of the pin is held in a neutral position away from an end surface of the long hole by the torsion coil spring. According to this configuration, the lost motion plate rotates integrally with the shift shaft in response to the shift operation, but the drive plate does not move immediately after the shift operation with the large operating load. Therefore, the pin coupled to the drive plate and the long hole of the lost motion plate relatively move against the reaction force of the torsion coil spring, and the rotation of the shift shaft is absorbed by the lost motion mechanism. When the pin coupled to the drive plate and the end surface of the long hole of the lost motion plate are in contact with each other by the further shift operation, the rotation of the shift shaft is transmitted to the drive plate with the delay, and the shift cam is moved by the drive plate.

In a third aspect, based on the first aspect or the second aspect, the lost motion mechanism is accommodated in a case (crankcase 11) of the transmission device. According to this configuration, since the lost motion mechanism is accommodated in the case of the transmission device, it is possible to lower a weatherability requirement such as rust prevention without affecting a layout of an outside of a vehicle body.

In a fourth aspect, based on any one of the first to third aspects, a clutch (17) configured to transmit or block power from a crankshaft (25) is provided on one side of the transmission device in a vehicle width direction, and the lost motion mechanism is located behind the clutch. According to this configuration, the lost motion mechanism is provided by effectively utilizing a space behind the clutch, and an increase in dimension of the case of the transmission device in the vehicle width direction is prevented.

In a fifth aspect, based on the fourth aspect, an accommodation chamber of the clutch is formed in a case of the transmission device in a manner of extending rearward, and the lost motion mechanism is accommodated in an extended portion of the accommodation chamber of the clutch. According to this configuration, since the lost motion mechanism is accommodated in the accommodation chamber of the clutch, it becomes unnecessary to lubricate the lost motion mechanism due to splashing or immersion of engine oil during operation.

In a sixth aspect, based on any one of the first to fifth aspects, engine torque input to the transmission device is controlled by a control device (70), and the lost motion mechanism absorbs the rotation of the shift shaft and delays the power transmission to the drive plate until the engine torque is temporarily reduced by the control device after the shift operation. According to this configuration, after the engine torque is reduced and the operating load of the shift operation becomes small, the power is transmitted from the shift pedal to the shift cam, and thus the operation feeling of the shift operation can be improved.

Although the present embodiment has been described, as another embodiment, the above-described embodiment and modifications may be combined entirely or partially.

In addition, the technique of the present disclosure is not limited to the above-described embodiments, and various changes, replacements, and modifications may be made without departing from the gist of the technical concept. Further, the present disclosure may be implemented by other methods as long as the technical concept can be implemented by the methods through advance of the technique or other derivative techniques. Therefore, the claims cover all embodiments that may fall within the scope of the technical concept.

What is claimed is:

1. A shift device that causes a transmission device to shift in response to a shift operation of a shift pedal, the shift device comprising:
    a shift shaft configured to rotate in response to the shift operation of the shift pedal;
    a shift cam configured to rotate in a manner of being capable of changing a coupling state of a shift gear of the transmission device;
    a drive plate configured to move the shift cam in response to the rotation of the shift shaft; and
    a lost motion mechanism interposed between the shift shaft and the drive plate, wherein
    the lost motion mechanism is attached to one end portion of the shift shaft and absorbs the rotation of the shift shaft to delay power transmission to the drive plate,
    the lost motion mechanism includes
        a lost motion plate configured to rotate integrally with the shift shaft,
        a pin holder configured to hold a pin and rotate relative to the shift shaft, and
        a torsion coil spring attached to the lost motion plate,
    a long hole is formed in the lost motion plate along a rotation direction,
    one end of the pin is inserted into the long hole,
    the other end of the pin is coupled to the drive plate, and
    the one end of the pin is held in a neutral position away from an end surface of the long hole by the torsion coil spring.

2. The shift device according to claim 1, wherein the lost motion mechanism is accommodated in a case of the transmission device.

3. The shift device according to claim 1, wherein a clutch configured to transmit or block power from a crankshaft is provided on one side of the transmission device in a vehicle width direction, and the lost notion mechanism is located behind the clutch.

4. The shift device according to claim 3, wherein an accommodation chamber of the clutch is formed in a case of the transmission device in a manner of extending rearward, and the lost motion mechanism is accommodated in an extended portion of the accommodation chamber of the clutch.

5. The shift device according to claim 1, wherein engine torque input to the transmission device is controlled by a control device, and the lost motion mechanism absorbs the rotation of the shift shaft and delays the power transmission to the drive plate until the engine torque is temporarily reduced by the control device after the shift operation.

* * * * *